US 6,584,562 B1

United States Patent
Fiori

(10) Patent No.: US 6,584,562 B1
(45) Date of Patent: *Jun. 24, 2003

(54) DEVICE FOR SECURING A TELEPHONE LINK BETWEEN TWO SUBSCRIBER SETS

(75) Inventor: Costantino Fiori, Echirolles (FR)

(73) Assignee: France Telecom, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/209,960

(22) Filed: Dec. 10, 1998

(30) Foreign Application Priority Data

Dec. 11, 1997 (FR) .............................. 97 15713

(51) Int. Cl.$^7$ .............................. H04L 9/16; H04K 1/00
(52) U.S. Cl. ........................................ 713/151; 380/257
(58) Field of Search .................................. 713/151, 201; 380/257, 44, 46, 270, 33

(56) References Cited

U.S. PATENT DOCUMENTS

| 4,802,220 A | * | 1/1989 | Marker, Jr. | .................. 380/33 |
| 5,438,622 A | * | 8/1995 | Normile et al. | ............... 380/46 |
| 5,963,644 A | * | 10/1999 | Fiori | .......................... 380/257 |

FOREIGN PATENT DOCUMENTS

| EP | 0 436 799 | 7/1991 |
| EP | 0 511 497 | 11/1992 |

OTHER PUBLICATIONS

Tanaka et al., "A Confidentiality System for ISDN inter–PC High–Speed File Transfer," Proceedings of the Conference on Computer Communications, vol. 3, Jun. 12, 1994, pp. 1270–1277.
Presttun, "Integrating Cryptography in ISDN," Advances in Cryptology, Aug. 1987, pp. 9–18.
Lu et al., "Secure Communication in Internet Environments: A Hierarchical Key Management Scheme for End–To–End Encryption," IEEE Transaction on Communications, vol. 37, No. 10, Oct. 1989, pp. 1014–1023.
"Method of Providing Encryption/Decryption for Integrated Services Digital Network Telecommunications," IBM Technical Disclosure Bulletin, vol. 34, No. 1, Jun. 1991, pp. 331–338.
Search Report for Application No. FR 9715713 dated Oct. 7, 1998.

* cited by examiner

Primary Examiner—Matthew Smithers
(74) Attorney, Agent, or Firm—Meyerstons, Hood, Kivlin, Kowert & Goetzel, P.C; Eric B. Meyerstons

(57) ABSTRACT

The securing of a telephone link between the two subscriber sets is established on the basis of encryption keys transmitted over the service channel (D) of the ISDN network whether the link be established on the switched telephone network (PSTN) or on the Internet network (NSTN).

A server verifies the identifiers of the subscriber taps (PA1, PA2) and stores the encryption keys.

20 Claims, 2 Drawing Sheets

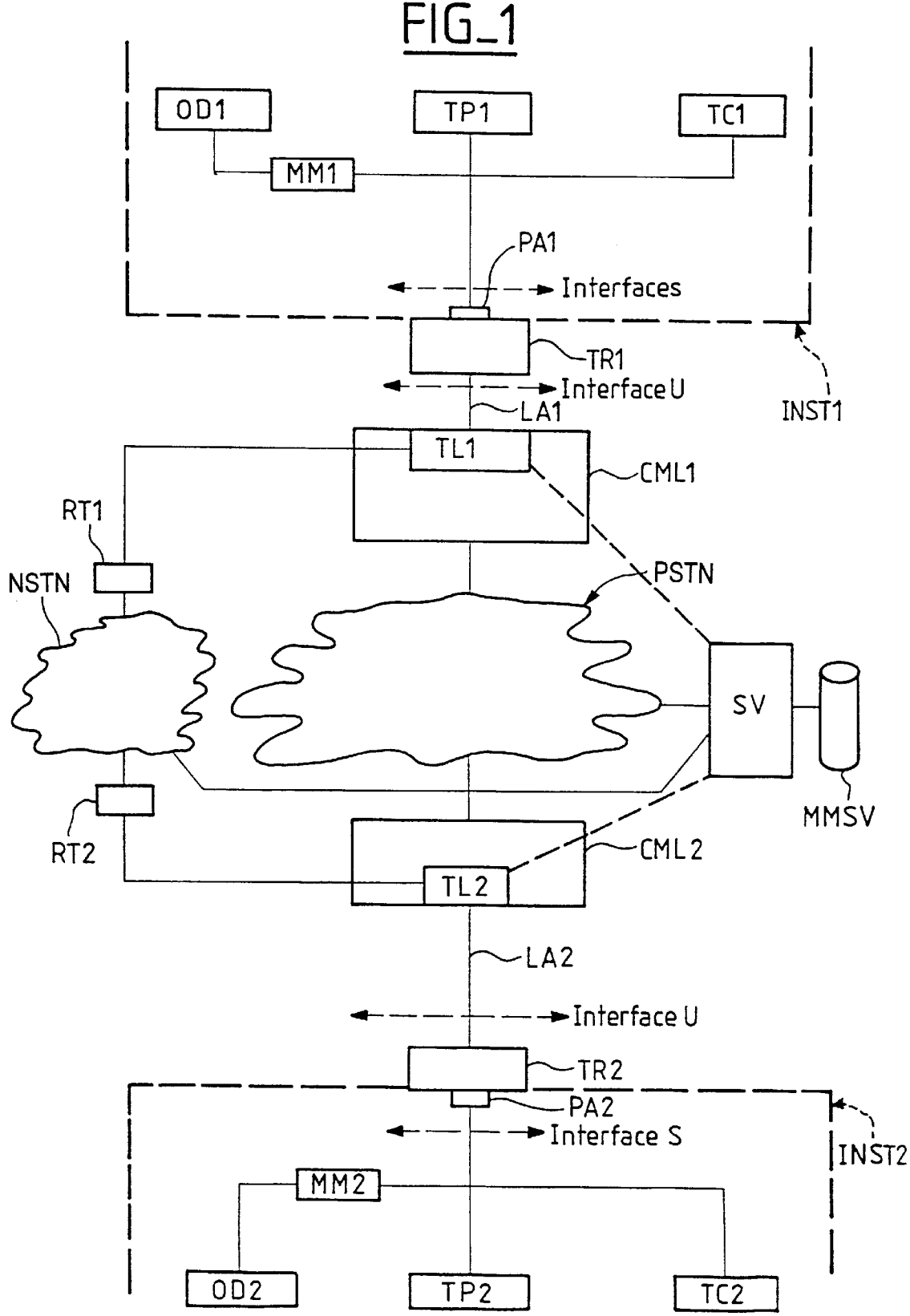

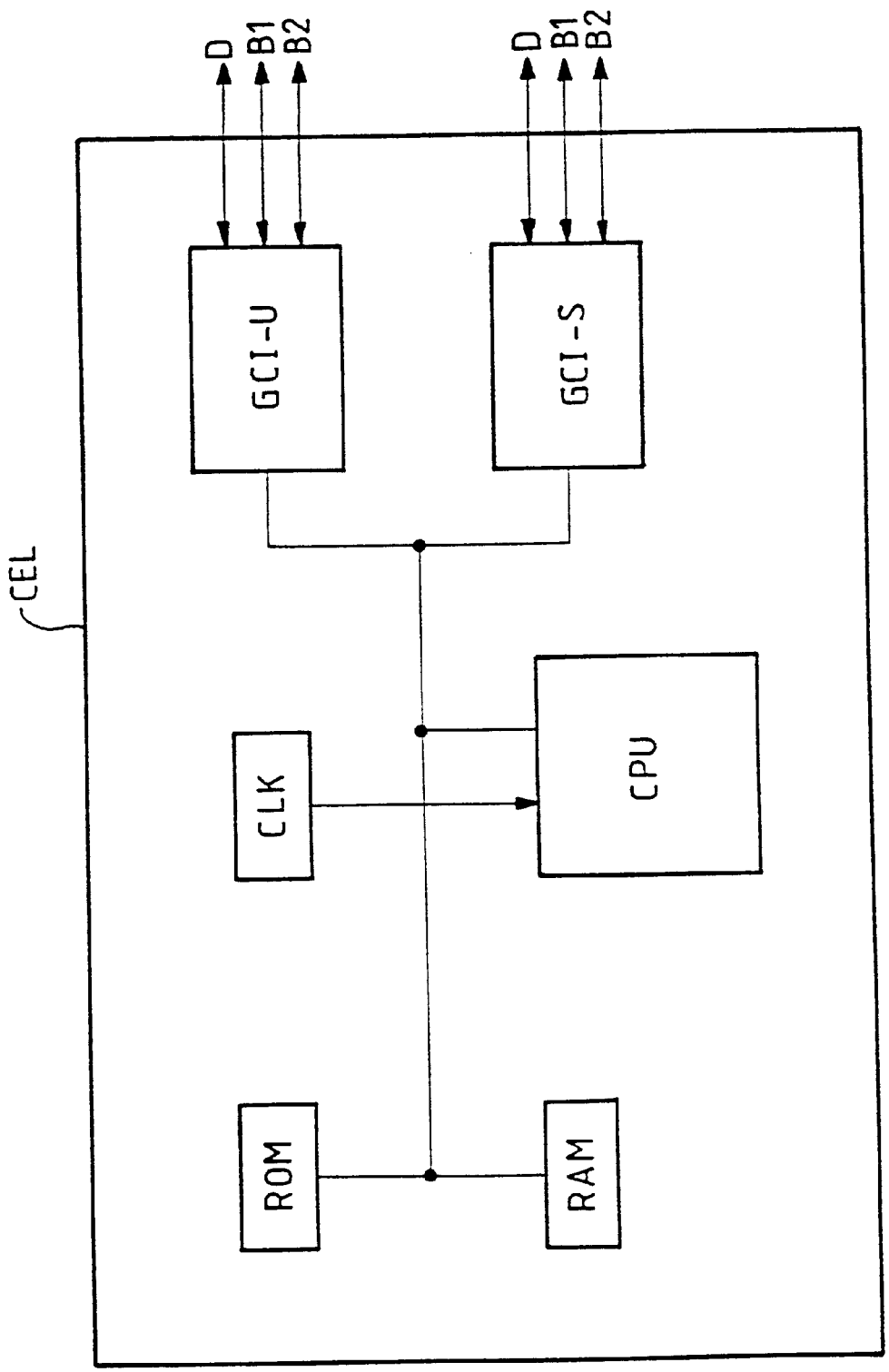
FIG_2

DEVICE FOR SECURING A TELEPHONE LINK BETWEEN TWO SUBSCRIBER SETS

BACKGROUND OF THE INVENTION

1. Field of the Invention

The invention relates to the securing of a telephone link connecting two subscriber sets, that is to say in particular the protection of this telephone link against the pirating of the information exchanged between the two subscriber sets.

2. Description of the Related Art

In terms of hardware, a telephone link comprises various items of equipment such as network terminals, line terminals, subscriber lines, local switching centers and the public switched telephone network. When this telephone link is established by using a nonswitched telephone network (for example the Internet network) there is also provision for routing devices specific to this network.

More precisely, each subscriber set, for example a telephone set or a modem linked to a computer, is connected, by way of a subscriber tap, to a network terminal, consisting essentially, in terms of hardware, of a specific card, such as for example a so-called TNR card marketed by various companies such as ALCATEL, SAT, SIEMENS or PHILIPS. Each network terminal is linked by way of a subscriber line to a line terminal situated at a local switching center. In terms of hardware, the line terminal also comprises a specific card, in particular a TABN card marketed by these same companies, and comprising eight inputs/outputs so as to manage eight subscriber lines. The two local switching centers associated with the telephone link connecting the two relevant subscriber sets are mutually linked by a public switched telephone network.

Moreover, these two line terminals are also linked by way of specific routing devices connected to a nonswitched public telephone network (for example Internet). The person skilled in the art is aware that such a nonswitched public telephone network does not differ, in terms of hardware, from the public switched telephone network. It is in fact a virtual network which uses the hardware resources of the public switched telephone network when they are available. One speaks of a nonswitched telephone network since it does not employ the local switching centers to establish a fully defined and identified link for exchanging useful information between the two subscriber sets.

The transfer, exchange of data and of documents performed by means of these subscriber sets have, in the course of the present decade, become methods for routine communications between geographically remote individuals and/or entities. This worldwide process of electronic communication has been further accelerated in the course of recent years with the planet-wide development of the Internet network. Through these technologies, without the obvious intervention of an intermediary and almost in real time, the economic world exchanges and transmits information which may exhibit higher or lower degrees of confidentiality.

The current use of these new forms of communication has highlighted the problem of the securing of exchanges between opposite parties, that is to say between a sender and his intended recipient. One of the priority objectives of these is then to avoid it being possible for the information which they convey by way of the switched or nonswitched public telephone network to be picked up and used without their knowledge by third parties. A solution to this problem could consist in installing encryption/decryption means in the local network of each subscriber, that is to say upstream of the subscriber tap. In this case, the information exchanged between the two subscriber sets is encrypted end-to-end between each encryption/decryption means installed at the subscriber's local level. However, such a solution has numerous drawbacks.

It requires firstly that the encryption/decryption hardware, and the corresponding software implemented in this hardware, be fully mutually compatible. In practice, the hardware and the software will have to be almost identical. Now, this is difficult to achieve, having regard to the very large disparity which may exist between the various subscribers. Moreover, such a solution requires a third-party agency managing the allocation of the various encryption keys to the subscribers. Furthermore, the communicating of the encryption keys between this third-party agency and each of the subscribers must also be secure, this constituting an additional difficulty.

Finally, in the case in which a secure subscriber wishes to contact a nonsecure subscriber, the former must provide for means internal to his local network, which are capable of disconnecting his own encryption/decryption means.

SUMMARY OF THE INVENTION

Described herein is a system for securing of a telephone link between two subscriber sets, whether this telephone link be established on the switched telephone network or on the nonswitched network, for example Internet, and which is simple to manage at the level of the encryption keys used, and which leaves the entire network transparent and open in the event of an exchange of information between a nonsecure subscriber and a secure subscriber.

Also described is a securing system which adapts without any additional constraint, other than those already fixed by the telecommunication operator on the already existing network, whilst ensuring good security of the data transmitted.

In one embodiment, the system secures a telephone link between two subscriber sets, this link being established by way of a switched telephone network or a nonswitched telephone network at the request of the calling subscriber.

According to one formulation, the system comprises:

two network terminals each comprising a specific input/output port to which is connected a subscriber set, network encryption/decryption means and a memory containing an identifier of the said port, two line terminals mutually linked both by the nonswitched telephone network and by the switched telephone network, and linked furthermore to the two network terminals by two subscriber lines, checking means connected to the switched and nonswitched telephone networks, able to verify the identifiers of the two relevant input/output ports and to deliver or not to deliver an encryption authorization signal, generating means connected to the switched and nonswitched telephone networks, able in the presence of the encryption authorization signal to generate at least one encryption key, to vary it temporally in a pseudo-random manner, and to forward it to the network encryption means as well as to the checking means, the network encryption means encrypting, between the two network terminals and on the basis of the encryption key, the useful information exchanged between the two subscriber sets, the information exchanged between the two call sets being transmitted unenciphered between each network terminal and the corresponding subscriber set.

Stated otherwise, the system provides for the installing in the network terminal of each secure subscriber, of encryption/decryption means capable of employing security protocols on the basis of encryption keys generated by generating means connected to the switched telephone network and to the nonswitched telephone network.

Moreover, the telecommunication operator is the sole owner of the solutions and of the technical hardware which he uses to secure his subscriber lines. In practice, he will install identical hardware and identical software in the various local switching centers and in the various network terminals. The problem of the compatibility of the encryption/decryption software used at the various sites of the telephone network is therefore automatically catered for.

Moreover, the checking means, for example a server connected both to the switched telephone network and to the nonswitched telephone network, caters for a dual function of verifying the identifiers of the two relevant input/output ports, and hence verifying that the two subscribers are registered with the secure service and also storage of the various encryption keys used in real time so that the operator can, for security reasons, ascertain in real time, if relevant, the encryption key used at the current instant.

In this regard, the server can incorporate the encryption key generating means and transmit them to the various encryption/decryption means.

As a variant, each network terminal can incorporate means for generating the encryption keys. In this case, the encryption keys are generated in a stand-alone manner and on the initiative of the calling network terminal, thereby making access to these keys even more difficult for any third party.

However, in this case, the generating means transmit in real time the encryption keys thus automatically generated to the checking means (server).

Although the invention is applicable to all telephone networks, in particular analog telephone networks on condition that provision is made for analog/digital conversions for the encrypting of information, the invention applies preferably and advantageously to a digital telephone network such as the integrated services digital network (ISDN) defined in ITU-T recommendations of Series I, published by the International Telecommunications Union (formerly CCITT).

More generally, in a digital telephone link, there are provided at least two bidirectional channels, or B channels, for exchanging useful information proper between the two subscriber sets, that is to say for example verbal information or computer data or else contents of letters transmitted by facsimile, as well as a service channel, or D channel, operating in message mode for transporting the signaling and packet mode services.

In the case of an application of the invention to a digitized network, analog/digital conversion is thus completely circumvented, thereby simplifying the means utilized, and the checking means then advantageously verify the identifiers of the two input/output ports by using the service channel, whether the telephone link for exchanging useful information between the two subscriber sets be established on the switched network or on the nonswitched network (Internet). Likewise, it is particularly advantageous for the means for generating encryption keys to transmit in real time the various encryption keys used in the course of a telephone link, likewise by using the service channel or D channel, whether the telephone link for exchanging useful information between the two subscriber sets be established on the switched network or on the nonswitched network.

This embodiment makes it possible, especially when a telephone link is established on the Internet network, to make attempts at pirating almost impossible since the transmission of the encryption keys is not performed over the Internet network but over the D channel of the switched telephone network by way of the local switching centers.

The invention also makes provision for the network encryption/decryption means of each network terminal advantageously to be situated between the U interface and S interface of the terminal. This is because, on the subscriber line, when a network of the ISDN type is used, the B bidirectional channels and the D service channel are not discernible. In combination with this locating of the encryption/decryption means between the U interface and the S interface, there is provision for each network terminal to comprise routing means for routing the data received by the U interface either toward the network encryption/decryption means if the link is to be made secure, or directly toward the S interface, that is to say without going via the network encryption/decryption means, if the link is not secure.

When the telephone link uses the nonswitched network (Internet), provision is then made for each network terminal to possess a locating address on the nonswitched network (Internet address). The network encryption/decryption means of the calling network terminal are thus advantageously able to encapsulate the locating address of the called subscriber set as well as the useful information in the locating address of the called network terminal.

BRIEF DESCRIPTION OF THE DRAWINGS

Other advantages and characteristics of the invention will emerge on examining the detailed description of a purely nonlimiting embodiment and the appended drawings in which:

FIG. 1 is a diagrammatic overview of an embodiment of the device, and

FIG. 2 diagrammatically illustrates in greater detail the internal architecture of a network terminal.

An embodiment of the system using a digitized network, and also the Internet network, will now be described.

DETAILED DESCRIPTION OF THE PREFERRED EMBODIMENTS

A digital network comprises, on a copper telephone pair, two bidirectional channels, or B channels, at 64 Kbits/s, switched in circuit mode, and which are used to transport all types of useful information exchanged between the two subscribers, for example, a telephone conversation, computer data, etc.

Apart from these two B bidirectional channels, there is also provided a service channel, the so-called D channel, at 16 Kbits/s, operating in message mode for transporting the signaling and packet mode services. Such a structure is in particular that adopted for the so-called "narrow band" ISDN integrated services digital network. Although basic rate access, described hereinabove, and also termed 2B+D, is limited to 144 Kbits/s, provision is also made for a so-called "primary" access, also termed 30B+D, possessing a bit rate of 2048 Kbits/s, and comprising 30 B bidirectional channels, and one D channel utilized in packet and signaling support mode. The so-called primary access makes it possible to develop a wide range of telecomputing applications combining voice, data, text and picture.

Although the general structure of a digital telephone network is entirely known to the person skilled in the art, the latter may nevertheless refer for further details to the ITU-T recommendations of Series I, published by the International Telecommunications Union and relating to the various technical and structural aspects, especially of the integrated services digital network (ISDN).

As illustrated in FIG. 1, the subscriber terminal installation INST1 comprises for example a telephone set TP1, a computer OD1 associated with a modem MM1, as well as a fax machine TC1. All of these items of apparatus are linked to a subscriber tap PA1 output-linked to a network terminal TR1.

The network terminal TR1 is linked by a subscriber line LA1 to a line terminal TL1 incorporated within a local switching center CML1.

The local switching center CML1 is linked to the local switching center CML2 of the other subscriber by way of the public switched telephone network PSTN.

Elements similar to those just described in respect of the first subscriber are also found with regard to the second subscriber, as illustrated at the bottom of FIG. 1.

Moreover the two line terminals TL1 and TL2 are also linked by way of two routing devices RT1, RT2, construction of which is known per se, which are connected to the nonswitched telephone network, or Internet network NSTN.

Finally, a server SV comprising processing means, for example a computer, is connected both to the switched telephone network PSTN and to the Internet network NSTN. This server SV moreover comprises a storage memory MMSV, the function of which will be returned to in greater detail hereinafter.

Although FIG. 1 represents a centralized server SV, the system can also provide for the incorporation of several local servers, for example incorporated within the line terminals TL1 and TL2.

FIG. 2 illustrates an electronic card incorporated into a network terminal associated with a subscriber who has signed up to the secure service.

This electronic card CEL comprises a standardized ISDN U+S interface circuit, respectively referenced GCI-U and GCI-S (such as Alcatel Mietec MTC 20277). The GCI-U circuit is linked to the subscriber line LA1 by the U bus of the interface circuit and makes it possible in particular to differentiate between the D channel and two bidirectional channels B1 and B2 of the ISDN network.

The GCI-S circuit is linked to the subscriber tap PA1 by the S bus of the ISDN interface circuit.

These two circuits GCI-U and GCI-S are linked to a microprocessor CPU clocked by a clock signal CLK (derived from the one carried by the ISDN network) and associated with a RAM memory (32 kbytes) and a ROM memory (32 kbytes). By way of example, the microprocessor used can be the ARM7TDMI microprocessor from the ARM company, working at a frequency of 16 MHz. In the ROM memory are installed encryption/decryption algorithms of the DES type (Data Encryption Standard) as well as public-key encryption/decryption algorithms of the RSA type which make it possible to embody network encryption/decryption means in software form.

Moreover, the microprocessor CPU incorporates routing means, also embodied in software form, capable, in response to an encryption authorization signal, of transmitting to the encryption/decryption means the information received from the GCI-U interface before retransmitting it to the GCI-S interface and vice versa. Conversely, in the absence of an encryption authorization signal, the switching means incorporated into the microprocessor CPU convey, without encryption, the information from the GCI-U interface to the GCI-S interface and vice versa.

In the case of a securing of the link, one embodiment of the microprocessor CPU encrypts and decrypts 3500 blocks per second in DES mode (one DES block consists of 64 bits). This processing speed is adequate for the transmission speeds of the digital network described here, namely 64 Kbits/s for a B channel. Thus, in DES mode, the encryption/decryption means encryts or decrypts 1000 blocks a second so as to be compatible with the bit rate of the ISDN network.

Moreover, in the embodiment described here, the server SV incorporates checking means, also embodied in software form within the computer of the server, pseudo-random means for generating DES encryption keys as well as encryption/decryption means of the public-key type (RSA).

A mode of operation of the device according to the invention will now be described in greater detail.

It is now assumed that the subscriber 1 decides by way of his telephone set TP1 to call the telephone set of the subscriber 2 by using the switched telephone network.

Generally, each subscriber tap possesses an identifier which may be a code stored in the ROM memory of the electronic card CEL of the network terminal associated with this tap PA1. The server has available a central file contained in the memory MMSV cataloguing the subscribers who have signed up to the securing service.

When the subscriber TP1 calls the subscriber TP2 and wishes to secure his link, the subscriber TP1 keys in the call number of the subscriber TP2 followed, for example, by a specific signal such as for example the hash keypad button. Recognition of this hash button by the network terminal TR1 makes it possible to establish a link with the server SV. The server SV receives the request for making secure as well as the call number of the subscriber TP2 and verifies in his file whether the latter is actually one of the subscribers who has signed up to the securing service. If this is not the case, the server dispatches an encryption nonauthorization signal to the network terminal TR1, this resulting in an unenciphered message on the telephone set of the subscriber TP1, indicating that the link cannot be made secure. In this case, either the subscriber TP1 decides not to effect this link or he decides to effect it in a nonsecure manner.

It is now assumed that the subscriber TP2 is actually one of the subscribers who has signed up to the securing service.

Before supplying an encryption authorization signal, the checking means of the server SV verifies the respective identifiers of the two subscriber taps of the two network terminals TR1 and TR2. To do this, the microprocessors incorporated within these two network terminals transmit, encrypted with the aid of the RSA encryption software, the the aforementioned identifiers. The identifiers are decrypted by the encryption/decryption means of the server and then verified by comparison with the identifiers stored in the memory MMSV of the server. If the check is positive, the generating means of the server transmit, encrypted with the aid of the RSA algorithm, and over the D channel, a secret encryption key for carrying out the encryption of the information exchanged between the two subscribers with the aid of the DES algorithm.

It has been observed that it proved to be very difficult, or even almost impossible, to be able to intercept and exploit the encryption keys and all the information flowing along the service channel, especially when this information is itself made secure by encryption/decryption means such as the public-key algorithms of the RSA type.

The encryption keys thus transmitted to the CPU processors of the network terminals TR1 and TR2 are stored in the RAM memories. The receiving of these keys acts for example as encryption authorization signal. The useful information exchanged between the subscriber sets TP1 and TP2 will therefore be transmitted unenciphered at the level of the local installations INST1 and INST2 but will be encrypted thereafter between the network terminals TR1 and TR2, using the encryption keys and the DES algorithm.

So as to further increase the secure nature of the link, the generating means of the server will vary the original key in a pseudo-random manner in the course of the telephone link. To do this, one embodiment makes provision to lodge a table of encryption keys in one part MR (not shown) of the memory MMSV of the server. The generating means of the server also incorporate a pseudo-random generator which, at a predetermined clock rate, generates numerical indications representative of the various addresses of the memory MR. When the generating means wish to generate a decryption key, the central processing unit of the computer then reads the current value supplied by the pseudo-random generator and extracts from the memory MR the encryption key contained in the address corresponding to this current value. This new encryption key is then encrypted by the encryption/decryption means of the server by using the RSA algorithm and then transmitted over the D channel to the two microprocessors of the network terminals TR1 and TR2. These latter, after having decrypted the new encryption (encipherment) key, then continue the encryption (encipherment) with this new key and the DES algorithm.

Now in the case in which the subscriber TP2 is not a secure subscriber and if, however, the subscriber TP1 wishes to establish a telephone line with the subscriber TP2, the microprocessor of the terminal TR1 will then route directly the data exchanged between the U interface and the S interface without using the network encryption/decryption means.

It is now assumed that the subscriber TP1 wishes to establish a link with the subscriber TP2 via the NSTN Internet network. The subscriber TP2 is assumed to have an Internet address AD2.

In a manner similar to what was described earlier, the subscriber TP1 keys in the Internet address AD2 of the subscriber TP2 followed by a specific indication whose consequence is to transmit the said address AD2 to the server SV via the Internet network. The server then searches in the memory MMSV for the Internet address ADR2 of the network terminal TR2 on which the subscriber TP2 is dependent. After verifying that the terminal TR2 is indeed one of the terminals which can be made secure, the server SV will proceed with the authentication of the identifiers of the subscriber taps of the network terminals TR1 and TR2.

In this regard, although these identifiers can be transmitted encrypted with the aid of the RSA algorithm, via the Internet network, it is particularly advantageous for the microprocessors CPU and the computer of the server to establish automatically in parallel with the Internet link, a link over the D channel of the switched telephone network. This is readily achievable in particular by the server knowing the identifiers (subscriber line no.+Internet address of the subscriber termination) of the network terminals TR1 and TR2. Once this link has been established, the identifiers are advantageously transmitted over the D channel in a manner similar to what was described earlier. Likewise, after authentication, the secret encryption keys which can be used for the DES algorithm are then retransmitted to the terminals TR1 and TR2 over the D channel.

Likewise, in the course of the exchanging of information via the Internet network, transmission of the new encryption keys generated in a pseudo-random manner will be performed also over the D channel. This very significantly enhances the degree of securing of an Internet link by making the intercepting of these encryption keys almost impossible.

Moreover, when the secret DES keys, which have been decrypted by the RSA decryption means, contained in the network terminals TR1 and TR2, have been stored in the RAM memories of these terminals, the encryption means of the network terminal TR1 encrypt the Internet address AD2 of the subscriber TP2 as well as the useful information intended therefor, then encapsulate this encrypted information in the Internet address ADR2 of the network terminal TR2. This encapsulation is a technique known per se by the person skilled in the art and in particular complies with the IPv4 and IPv6 protocols detailed in particular in the following publications:

C. Huitema IPv6 the new Internet protocol, Englewood Cliffs, No. 5 Prentice Hall, 1996;

Leiner B. M. et al The DARPA Internet protocole Suite, IEEE Communications Magazine, Vol. 23, 1985.

The processor CPU of the terminal 2 then de-encapsulates the information contained and decrypts it for the purposes of transmission to the subscriber TP2.

It should be noted here that data encapsulation in the Internet address of a network terminal acts as a signal of the presence of a secure link necessitating decryption of the information.

The person skilled in the art will therefore have noted here that the invention therefore makes it possible to transform the network terminals TR1 and TR2 into routing devices which are functionally similar to the conventional routing devices of the Internet network.

What is claimed is:

1. A system for securing a telephone link between two subscriber sets, wherein the link is established through a switched telephone network or through a nonswitched telephone network at the request of the calling subscriber, the system comprising:

two network terminals, wherein each of said network terminals comprises:
an input/output port coupled to one of the subscriber sets;
network encryption/decryption means; and
a memory comprising an identifier of the port;

two line terminals mutually linked both by the nonswitched telephone network and by the switched telephone network, and linked furthermore to the two network terminals by two subscriber lines;

checking means connected to the switched and nonswitched telephone networks, configured to verify the identifiers of the two input/output ports, and configured to deliver an encryption authorization signal;

means for generating encryption keys, wherein said means for generating encryption keys is coupled to the switched and nonswitched telephone networks and is configured:
to generate at least one encryption key in response to the encryption authorization signal;
to vary the encryption key temporally in a pseudo-random manner; and
to forward the encryption key to the network encryption/decryption means and to the checking means;

wherein the network encryption means is configured to encrypt, between the two network terminals and on the basis of the encryption key, information exchanged between the two subscriber sets, the information exchanged between the two subscriber sets being transmitted unenciphered between each network terminal and the corresponding subscriber set;

wherein the switched telephone network is of the digital type, having (i) at least two bidirectional channels for exchanging information between the two subscriber sets and (ii) a service channel, wherein the checking means verifies the identifiers of the two input/output ports by using the service channel; and wherein the means for generating the encryption keys transmits the encryption key or keys over the service channel when the telephone link is established on the nonswitched network, or on the switched telephone network.

2. The system according to claim 1, wherein the checking means comprise at least one server that incorporates the means for generating encryption keys.

3. The system according to claim 1, wherein the network encryption/decryption means of at least one of the two network terminals comprises the means for generating encryption keys.

4. The system according to claim 1, wherein the means for generating encryption keys comprises means for the pseudo-random generation of a plurality of encryption keys.

5. The system according to claim 1, wherein the network encryption/decryption means of each network terminal is situated between a U interface and an S interface of the network terminal and wherein each network terminal comprises routing means for routing the received by the U interface either toward the network encryption/decryption means or directly toward the S interface.

6. The system according to claim 1, wherein each network terminal possesses a locating address on the nonswitched telephone network, and wherein the network encryption/decryption means of the calling network terminal is configured to encapsulate the locating address of the called subscriber set as well as the information in the locating address of the called network terminal.

7. The system according to claim 1, wherein the checking means comprise at least one server that incorporates the means for generating encryption keys, and wherein the means for generating encryption keys comprises means for the pseudo-random generation of a plurality of encryption keys.

8. The system according to claim 1, wherein the network encryption/decryption means of at least one of the two network terminals comprises the means for generating encryption keys, and wherein the means for generating encryption keys comprises means for the pseudo-random generation of a plurality of encryption keys.

9. A method for securely communicating data from a first subscriber set to a second subscriber set, the method comprising:

establishing a link through a switched telephone network or through a nonswitched telephone network at the request of the calling subscriber;

the first subscriber set providing unencrypted data to a first network terminal associated with the first subscriber set;

verifying the identity of the first network terminal and the identity of a second network terminal associated with the second subscriber set;

in response to positive verification of the identities of the first and second network terminals, (i) encrypting the unencrypted data, (ii) the first network terminal communicating the encrypted data to the second network terminal, and (iii) unencrypting the encrypted data;

the second network terminal providing the unencrypted data to a second subscriber set;

wherein said encrypting the data includes generating one or more encryption/decryption keys and providing the encryption/decryption keys to the second network terminal through a service channel of a switched telephone network; and wherein said verifying the identities of the first and second network terminals is performed by a checking system that communicates with the first and second network terminals through a service channel of a switched telephone network.

10. The method of claim 9, further comprising:

in response to negative verification of the identity of the first network terminal or of the second network terminal, allowing the first network terminal to communicate the unencrypted data to the second network terminal.

11. The method of claim 9, wherein the first network terminal performs said communicating the encrypted data over an unswitched telephone network.

12. The method of claim 9, wherein the first network terminal performs said communicating the encrypted data over a switched telephone network.

13. The method of claim 9, wherein one or more of the first and second network terminals is a telephone.

14. The method of claim 9, wherein one or more of the first and second network terminals is a computer.

15. A system for securing a telephone link between a first telephone unit and a second telephone unit, wherein the link is established through a switched telephone network or through a nonswitched telephone network at the request of a calling subscriber, the system comprising:

a first network terminal and a second network terminal, wherein each of said network terminals comprises:

an input/output port coupled to one of the telephone units;

encryption/decryption circuit coupled to said input/output port; and a memory coupled to said input/output port and holding an identifier of said input/output port;

a first line terminal and a second line terminal mutually linked both by the nonswitched telephone network and by the switched telephone network, wherein each of said line terminals is linked by a subscriber line to a corresponding one of said two network terminals;

an identity verification system connected to the switched and nonswitched telephone networks, configured to verify the identifiers of the two input/output ports, and configured to deliver an encryption authorization signal;

a key server, wherein said key server is coupled to the switched and nonswitched telephone networks and is configured to generate least one encryption key in response to the encryption authorization signal, to update the encryption key temporally in a pseudo-random manner, and to forward the encryption key to the encryption/decryption circuit and to the identity verification system;

wherein the encryption/decryption circuit is configured to encrypt, between the two network terminals and on the basis of the encryption key, information exchanged between the two telephone units, the information exchanged between the two telephone units being transmitted unenciphered between each network terminal and the corresponding telephone unit;

wherein the telephone link is established on the switched telephone network, and wherein the telephone link is a digital link comprising at least two bidirectional channels for exchanging information between the two telephone units, and a service channel, and wherein the key server transmits the encryption key or keys over the service channel;

wherein the switched telephone network is of the digital type with at least two bidirectional channels for exchanging information between the two telephone units, and a service channel, wherein the identity. verification system verifies the identifiers of the two input/output ports by using the service channel; and wherein the encryption/decryption circuit transmits the encryption key or keys over the service channel when the telephone link is established on the nonswitched network.

16. The system according to claim 15, wherein the identity verification system comprises at least one server that incorporates the key server.

17. The system according to claim 15, wherein the encryption/decryption circuit of at least one of the two network terminals comprises the key server.

18. The system according to claim 15, wherein the key server comprises means for the pseudo-random generation of a plurality of encryption keys.

19. The system according to claim 15, wherein the encryption/decryption circuit of each network terminal is situated between a U interface and an S interface of the network terminal and wherein each network terminal comprises routing means for routing the received by the U interface either toward the encryption/decryption circuit or directly toward the S interface.

20. The system according to claim 15, wherein each network terminal possesses a locating address on the non-switched telephone network, and wherein the encryption/decryption circuit of the calling network terminal is configured to encapsulate the locating address of the called telephone unit as well as the information in the locating address of the called network terminal.

* * * * *